United States Patent [19]
Lee et al.

[11] Patent Number: 5,441,558
[45] Date of Patent: Aug. 15, 1995

[54] HIGH PURITY NITROGEN PSA UTILIZING CONTROLLED INTERNAL FLOWS

[75] Inventors: Sang K. Lee, Allentown; Andrew W. Wang, Alburtis; Robert Paul, Nesquohoning, all of Pa.

[73] Assignee: Air Products and Chemicals, Inc., Allentown, Pa.

[21] Appl. No.: 287,985

[22] Filed: Aug. 9, 1994

[51] Int. Cl.⁶ .................................. BuiD 53/047
[52] U.S. Cl. ........................... 95/100; 95/103; 95/105; 95/138; 95/148
[58] Field of Search .................... 95/96–98, 95/100, 103–105, 138, 148

[56] References Cited

U.S. PATENT DOCUMENTS

| | | | |
|---|---|---|---|
| 4,256,469 | 3/1981 | Leitgeb | 95/96 |
| 4,348,213 | 9/1982 | Armond | 95/103 |
| 4,439,213 | 3/1984 | Frey et al. | 55/31 |
| 4,440,548 | 4/1984 | Hill | 95/100 |
| 4,548,799 | 10/1985 | Knoblauch et al. | 95/103 |
| 4,576,614 | 3/1986 | Armond et al. | 95/96 X |
| 4,746,332 | 5/1988 | Tomomura et al. | 95/138 |
| 4,925,461 | 5/1990 | Gemba et al. | 55/26 |
| 5,090,973 | 2/1992 | Jain | 55/26 |
| 5,108,467 | 4/1992 | Schroter et al. | 95/103 |
| 5,176,722 | 1/1993 | Lemcoff et al. | 55/26 |
| 5,346,536 | 9/1994 | Kaneshige et al. | 95/103 |

FOREIGN PATENT DOCUMENTS

| | | | |
|---|---|---|---|
| 0284448 | 9/1988 | European Pat. Off. | 95/96 |
| 0354259 | 2/1990 | European Pat. Off. | 95/103 |
| 63-79714 | 4/1988 | Japan . | |
| 64-56113 | 3/1989 | Japan . | |
| 3-228806 | 10/1991 | Japan | 95/96 |
| 3-238018 | 10/1991 | Japan | 95/96 |
| 5-192527 | 8/1993 | Japan | 95/96 |

*Primary Examiner*—Robert Spitzer
*Attorney, Agent, or Firm*—Geoffrey L. Chase

[57] ABSTRACT

The present invention is a nitrogen pressure swing adsorption process for separating gas mixtures containing nitrogen and oxygen, such as air, using a unique gas transfer process step, continuous feed gas introduction and an appropriate isolation step with continued product purge/repressurization to achieve high purity nitrogen product of 99.9% or greater by volume nitrogen, preferably 99.99% or greater by volume of nitrogen.

16 Claims, 3 Drawing Sheets

HIGH PURITY NITROGEN PSA UTILIZING CONTROLLED INTERNAL FLOWS

TECHNICAL FIELD

The present invention is a process for separating nitrogen from oxygen in a pressure swing adsorption process in which internal gas flows are controlled for optimum purity of nitrogen gas product.

BACKGROUND OF THE PRIOR ART

Nitrogen production by pressure swing adsorption (PSA) for industrial gas usage has become a significant share of the industrial gas market in recent years. However, this growth has been limited to a fairly well defined range of flow rates and purities over which the technology of pressure swing adsorption has been perceived by those skilled in the art to be amenable. A particular crucial limitation has been that the performance of traditional nitrogen pressure swing adsorption designs, both in power and capital costs, falls off sharply at purities of nitrogen greater than 99.9% by volume. For this reason, markets demanding greater than 99.9% by volume nitrogen purity have not been penetrated by pressure swing adsorption technologies to any great extent, and have largely been served by liquid nitrogen or liquid-assist nitrogen systems. However, the costs of this industrial nitrogen is relatively high, particularly in Japan and in the rapidly-developing markets in Latin America and Asia. There is growing demand for an economically competitive, non-cryogenic high purity nitrogen technology.

The existing technology for the production of non-cryogenic industrial nitrogen at purities of less than 0.1% oxygen include deoxo systems, vacuum swing adsorption systems, various modified pressure swing adsorption swing systems and various improvements on adsorbents used in such systems. However, despite these attempts to produce high purity industrial nitrogen such as is available from cryogenic large scale air separation systems, the industry has not provided a non-cryogenic nitrogen production process having high purities in excess of 99.9% nitrogen by volume with low capital cost and low power requirements. Various attempts have been made to produce non-cryogenic high purity nitrogen, such as recited below.

U.S. Pat. No. 5,176,722 discloses a pressure swing adsorption method which may use vacuum evacuation to produce nitrogen from air. The process recites the substantial equalization of pressures between two cyclically operated beds. Repressurization after equalization is conducted with product gas and feed gas mixture sequentially. During equalization, gas from the outlet of the high pressure bed is introduced to the inlet of a low pressure bed or optionally, gas from the outlet of high pressure bed is introduced simultaneously to the inlet and outlet of a low pressure bed. The simultaneous pressure equalization of both the inlet and outlet of the low pressure bed can be conducted for a portion or all of the pressure equalization step. Purities of this process are recited to be in the 90 to 99.9% range.

U.S. Pat. No. 5,090,973 discloses a pressure swing adsorption process for separating nitrogen from oxygen in air, in which a bed finishing adsorption can be evacuated and purged using a product-type gas having a higher purity than product generated by the adsorption bed itself. This higher purity product-type gas is produced by further purification using cryogenic or catalytic means or a gas sourced from a liquid source originating from other than the adsorption system itself. Simultaneous top and bottom pressure equalization is disclosed. As a result of the higher purity purge gas than product produced from the process being utilized for regeneration, product purities of 95 to 99.99% by volume nitrogen are identified as achievable.

U.S. Pat. No. 4,925,461 discloses an air separation process producing 99.99% by volume nitrogen, using either ambient depressurization or vacuum level depressurization and evacuation. Pressure equalizations are described as being short of full equalization and the equalization is conducted at the feed to feed ends of two beds while also being conducted at the outlet to outlet ends of the beds, wherein the gas transfer ratio of the feed ends to the outlet ends during pressure equalization is in the range of 3 to 70%.

Japanese Kokai 64-56113 similarly discloses a nitrogen pressure swing adsorption process with simultaneous pressure equalizations between the inlet and outlets of two beds, in which the flow rate across the inlets in comparison to the outlets is 3 to 70%. The patent advocates conducting the top and bottom gas transfer communications simultaneously to markedly decrease abrasion of the adsorbent particles. Oxygen impurity levels are reduced by this process down to 0.064% oxygen.

Japanese Kokai 63-79714 discloses a process for producing 99.99% nitrogen from air using a configuration of three adsorption beds, which during the regeneration are coupled in series.

Although the industry has created high purity nitrogen in excess of 99.9% nitrogen by volume in various pressure swing adsorption and vacuum swing adsorption processes, these processes have required unique sources of purge gas, additional purification technologies, additional capital costs for complex piping schemes and high power and overall capital costs. The present invention solves the problem of producing high purity nitrogen in excess of 99.9% nitrogen by volume in a low capital, low power process which minimizes the complexity of process operation. The present invention will be set forth below.

BRIEF SUMMARY OF THE INVENTION

The present invention is a process for separating a nitrogen-enriched gas from a feed gas mixture containing at least nitrogen and oxygen using a plurality of beds of adsorbent that preferentially adsorb oxygen more readily than nitrogen, comprising the steps of:

(a) introducing the feed gas mixture into a feed end of a first bed of the plurality of beds of adsorbent at an elevated feed pressure and adsorbing oxygen while removing unadsorbed nitrogen-enriched gas as a product from a product end of the first bed;

(b) discontinuing the feed gas mixture introduction into the first bed and connecting the product end of the first bed to the product end of the second bed of the plurality of beds which is at lower pressure and transferring gas from the product end of the first bed to the product end of the second bed, short of equalizing the pressure in the two beds;

(c) connecting the feed end of the first bed to the feed end of the second bed, during a latter portion of the transfer of gas from the product ends of the beds in step (b), to transfer gas from the feed end of the first bed to the feed end of the second bed, short of equalizing the pressure in the two beds;

(d) countercurrently depressurizing the first bed at a main rate of depressurization to the lowest pressure;

(e) passing nitrogen-enriched gas countercurrently through the first bed to purge oxygen from the bed;

(f) isolating the first bed for a predetermined period of time while supplying nitrogen enriched gas to the first bed at a reduced flow rate compared to step (e);

(g) connecting the product end of the first bed to the product end of another bed of the plurality of beds which set the elevated feed pressure in transferring gas from the product end of the other bed to the product end of the first bed, short of equalizing the pressure in the two beds;

(h) connecting the feed end of the first bed to the feed end of the other bed, during the latter portion of the transfer of gas from the product ends of the beds in step (g), to transfer a gas from the feed end of the other bed to the feed end of the first bed, short of equalizing the pressure in the two beds;

(i) further repressurizing the first bed by the introduction of product gas at the product end of the first bed; and (j) repeating these process steps in each of the plurality of beds.

Preferably, after discontinuing gas transfer between the two beds of step (c) and before the countercurrently depressurizing of the first bed at a first rate of depressurization, initially countercurrently depressurizing the first bed to an intermediate pressure at a preliminary rate of depressurization which is less than the main rate of depressurization.

Preferably, the first bed if further repressurized with feed gas mixture at the feed end of the first bed.

Preferably, the plurality of beds comprises two beds.

Preferably, the adsorbent is carbon molecular sieve.

Preferably, the nitrogen-enriched gas is 99.9% by volume nitrogen.

More preferably, the nitrogen-enriched gas is 99.99% by volume nitrogen.

Preferably, the feed gas mixture is introduced into a bed while it is receiving gas transferred from one of the plurality of beds of adsorbent.

Preferably, the introduction of feed gas mixture into a bed receiving gas transferred from one of the plurality of beds of adsorbent is at a rate less than step (a).

Preferably, the feed gas mixture is introduced into the plurality of beds of adsorbent continuously during the process.

Preferably, the feed gas mixture is air.

Preferably, the gas transferred in step (b) is in volumetric excess of the gas transferred in step (c).

Preferably, the elevated feed pressure is in the range of approximately 80 to 165 psia.

Preferably, the lowest pressure is in the range of approximately 20 to 14.7 psia.

Preferably, the volumetric ratio of the gas transfer of step (b) to a gas transfer of step (c) is in the range of approximately 1:1 to 1.3:1.

Preferably, the plurality of beds comprises two beds and the second bed and the other bed are the same bed.

DETAILED DESCRIPTION OF THE INVENTION

Figures 1, 2:
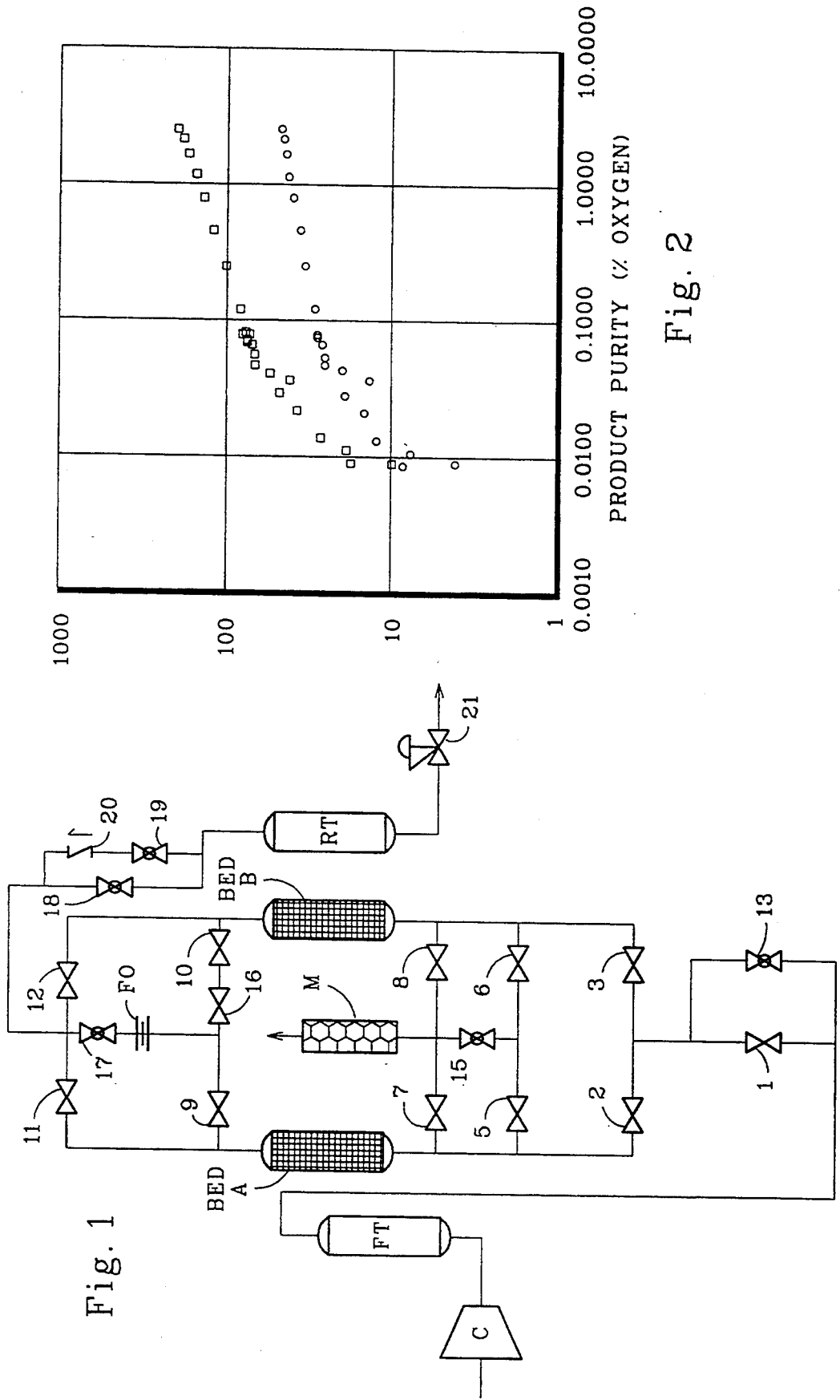
FIG. 1 is a schematic illustration of the valves, piping and vessels of a preferred embodiment of the present invention.
FIG. 2 is a graph of productivity (nitrogen, in standard cubic feet per hour/adsorbent, in cubic feet) represented by filled in or black squares, as well as recovery (percent nitrogen/air) represented by the open squares, each graphed against product purity by percent oxygen by volume in a standard nitrogen pressure swing adsorption process, such as in U.S. Pat. No. 4,439,213).

The present invention is a pressure swing adsorption process for separating nitrogen from oxygen in a feed gas mixture such as air, to result in a nitrogen-enriched gas product having purities in the range of 5% down to 5 parts per million by volume of oxygen content in the nitrogen-enriched gas. Generally, the present invention produces nitrogen at a purity in excess of 99.9% by volume nitrogen with low power and capital requirements and the absence of apparatus complexity so as to favorably compete with the nitrogen purities available from a cryogenically produced liquid nitrogen. This advantageous result is achieved by: (a) controlled flow of gas transfer between beds during partial repressurizations, such as are typically referred to in the industry as pressure equalizations, (b) providing primary as well as auxiliary feed and vent lines, (c) continuous operation of the feed gas mixture compressor and delivery of at least a portion of the feed gas mixture to one of the beds at all times of the cycle, (d) the presence of an isolation step with product gas introduction or purging, and (e) controlled timing and flow of gas during gas transfer during communication of the several beds of the process.

The present invention uses pressure swing adsorption in contrast to vacuum swing adsorption to avoid the capital costs of a vacuum pump and the power requirements of such a vacuum pump. Therefore, the pressures at which the present invention are operated with regard to the feed gas mixture pressure are in the range of 80 to 165 psia, preferably 100–150 psia. This constitutes the elevated feed pressure. In contrast, the lowest pressure to which the process of the present invention is depressurized for regeneration is in the range of approximately 20 to 14.7 psia, preferably ambient pressure which is typically 14.7 psia.

As stated above, the present invention utilizes a differential in gas transfer of the product to product end of the beds in comparison to the feed to feed end of the beds, both with regard to timing of the gas transfer as well as rate and volume of gas transfer. The gaseous transfer from the product to product end of the beds is conducted initially with the feed to feed end gas transfer being conducted in a delayed, but overlapping time sequence simultaneous with the latter portion of the product to product end gas transfer. The duration of the feed to feed end gas transfer in comparison to the product to product end gas transfer is in the ratio of 1:1 to 1:3, preferably 2:1. The volume of gas transferred from product end to product end is greater than the volume of gas transferred from the feed end to the feed end of the beds and this ratio is in the range of approximately 2.5 to 1.2, preferably 1.4. However, the rate of gas transfer is desirably slower in the product end to product end gas transfer and is generally in the range of 6 to 20 psi/second (psi/s), preferably 10 psi/s, while the rate of gaseous transfer at the feed to feed end is greater and is generally in the range of 10 to 30 psi/s, preferably 20 psi/s. Although pressure swing adsorption systems with bed to bed gas transfer are known to operate short of full pressure equalization, the delayed initiation of feed to feed gas transfer in relationship to product to product end gas transfer of the present invention has not been previously disclosed or recognized as an advantage in achieving the particularly high purities of nitrogen product of the present invention.

The present invention also performs depressurization after bed to bed gas transfer preferably in two stages, an initial stage at a slow rate of depressurization in the range of 15 to 25 psi/s, preferably 18 psi/s, (preliminary rate of depressurization) and a final stage of a higher rate of depressurization to the lowest pressure of the regenerating bed in the range of 25 to 45 psi/s, preferably 35 psi/s, (main rate of depressurization) to reduce the costs of capital equipment necessary to muffle the noise of depressurization and venting gases.

The present invention also implements an isolation or cut step in which the bed of the plurality of beds of the process is not engaged in a functional activity such as adsorption, desorption, gas transfer or repressurization in a substantial manner. This isolation step is appropriate in a two bed process, as is set forth, for the proper timing of the sequence of process steps. The present invention provides a low flow rate introduction of nitrogen-enriched gas from the product reservoir into the bed during the isolation step so as to prevent migration of desorbing oxygen molecules from the adsorbent into the region of the product end of the bed during the isolation step. Again, this low pressure purge or nitrogen product repressurization during the isolation step is undisclosed in the prior art and provides significant advantage in maintaining a clean product end adsorbent zone so as to achieve the particular high purities of nitrogen product achievable by the present invention. The flow rate of nitrogen-enriched gas into the bed during the isolation step is in the range of 25 to 50% of one bed volume per minute, preferably 40% and the pressure rise is typically no greater than a few pounds per square inch.

The present invention also utilizes product repressurization using nitrogen-enriched gas and feed repressurization utilizing feed gas mixture, such as air, the combination of which avoids product end bed contamination and yet maintains recovery and allows for a continuous operation of the feed gas mixture compressor and downsizing of the feed gas surge tank to minimize capital requirements while assisting in providing the higher purities of product achievable by the present invention. The product and feed repressurization is preferably conducted simultaneously.

As stated previously, the present invention is configured so as to allow at least a minimum introduction of the compressed feed gas mixture into one or more of the plurality of beds of the process by utilization of a bypass valve having a reduced flow rate so that in contrast to the prior art where the compressor output was entirely discontinued from the downstream process, the present invention allows a minimum flow of feed gas mixture from the output of the feed gas mixture compressor to go to the downstream process beds, typically at a rate of approximately 2 to 8 psi/s, preferably 3-5 psi/s. Again, this allows the process to economize on capital costs of the compressor and the feed gas mixture surge tank.

The process of the present invention utilizes a carbon molecular sieve adsorbent which preferentially adsorbs oxygen in contrast to nitrogen on a kinetic rather than an equilibrium basis. Such carbon molecular sieves are widely known and well established in the industry and are readily available from various sources, such as Carbo Tech in Germany, Calgon Corporation in the United States and Kuraray, Limited and Takeda, Limited in Japan, as well as other sources. These carbon molecular sieves typically carbonize a carbon source, such as coal, wood, coconut husks or petroleum-based hydrocarbons to produce a porous and microporous substrate which is then subjected to pore size engineering by the introduction of an additional carbon source into the pores of the substrate with subsequent heat treatment to result in pore diameters favorable to the kinetic size exclusion of nitrogen in contrast to oxygen on the resulting carbon molecular sieve. This class of carbon molecular sieve, which is available in various configurations and recipes is the appropriate adsorbent for the practice of the present invention.

By integrating these features of the present invention into a pressure swing adsorption process for separating nitrogen from oxygen in air, nitrogen-enriched gas as a product is achievable in greater than 99.9% by volume purity and preferably in greater than 99.99% by volume purity of nitrogen.

The present invention will now be set forth with regard to a particular preferred embodiment as illustrated in FIG. 1. A feed gas mixture, such as air at ambient temperature and pressure, is compressed in compressor C to a pressure of 100 psi a and fed to a feed gas mixture surge tank FT which buffers pressure of the feed gas mixture based upon the switching operation of the several beds of the process of the present invention and the continuous operation of the compressor C. The feed gas mixture is conducted from the vessel FT through valve 1 and valve 2 into bed A where oxygen is preferentially kinetically adsorbed on a charge of carbon molecular sieve, while nitrogen-enriched gas preferably having a purity of at least 99.9% nitrogen is removed through valve 11 and valve 18 to the nitrogen-enriched gas product reservoir tank RT. Nitrogen-enriched gas product can be drawn off through control valve 21 for downstream utilization. This adsorption process lasts for a period of between 40 and 200 seconds.

When the oxygen adsorption approaches the product end of bed A or a deterioration of product purity is determined or after a fixed period of time, bed A is then removed from adsorption and gas in bed A is transferred to bed B through valves 9, 16 and 10 from product end to product end of bed A and bed B, respectively. Simultaneously, feed gas mixture is admitted to bed B at a slow rate through open bypass valve 13 and valve 3. The main feed valve i remains closed. Subsequently, after a delay of three-quarters of the time of the gas transfer from bed A to bed B, valves 2 and 3 are opened to allow gas transfer from bed A to bed B from feed end to feed end of the respective beds. The proportion of gas transfer, product end to product end and feed end to feed end is predicated upon control by valve 16 as well as the time duration of the two respective gas transfers. Gas transfer is terminated short of pressure equalization. Typically, this gas transfer is terminated when the pressure in bed A or the depressurizing bed is at 55–70% of the maximum elevated feed pressure of the bed, in this instance, bed A during adsorption. The duration of the gas transfer is in the range of 2 to 6 seconds. Bed A is then regenerated by venting through valve 5 and 15 and sound muffler M, at an initial or preliminary rate of depressurization. Valve 15 is adjusted to restrict the flow of gas to minimize noise and eliminate the potential for adsorbent attrition due to agitation during rapid pressure changes. This initial depressurization lasts for 1 to 5 seconds. Subsequently, valve 7 is opened allowing less restricted depressurization of bed A, at a primary or main depressurization. At a predetermined time, valve 9 opens during this continued depressurization to allow nitrogen-enriched gas from vessel RT to countercurrently purge the carbon molecular sieve adsorbent in bed A of residual oxygen which is removed through valve 7 and muffler M. Purge flow is controlled through valve 17 and flow orifice FO. This main or latter stage of depressurization and purge lasts approximately 32 to 120 seconds.

Bed A is then isolated in an isolation or cut-step form active functional processing of the process cycle. Pressure in bed A gradually rises due to desorbing gas molecules, particularly oxygen molecules. In order to maintain high purity operation, particularly during longer isolation steps, continual introduction of nitrogen-enriched gas through valve 17 and 9 is permitted to suppress migration of oxygen molecules to the product end of bed A while achieving little pressure rise relative to overall pressure changes during the process cycle.

Gas is then transferred from bed B, which has conducted adsorption, to bed A through valves 9, 16 and 10 from product end to product end of the respective beds, while feed gas mixture is admitted slowly to bed A through valve 13 and 2. After the appropriate delay, described above, gas transfer from bed B to bed A is conducted through open valves 2 and 3. Comparable pressure ratios, time delays and gas volume transfers are adhered to during the gas transfer to pressurize bed A as in the gas transfer to depressurize bed A in favor of bed B.

At the termination of gas transfer from bed B to bed A, slow feed continues to be admitted through valve 13 and valve 2 into bed A, while valve 11 is opened to allow backflow of nitrogen enriched gas from reservoir RT through valves 18, 19 and 20. The repressurization with nitrogen-enriched gas continues until a pressure of 85% of the maximum elevated feed pressure is reached during the repressurization of approximately 0.5 to 3 seconds. Further repressurization is achieved when valve 1 is opened and feed gas mixture is introduced into bed A, which ultimately meets and exceeds the back pressure in the reservoir tank RT and begins nitrogen-enriched gas product production in a new feed step. This sequence of process steps is conducted in bed B in a comparable manner to bed A using valves 1, 13, 3, 6, 8, 10, 16, 17, 12, 18, 19, 20 and 21.

This cycle having presently been described with regard to FIG. 1 is set forth with regard to duration, valve operation and pressure in the respective beds in Table 1 below.

TABLE 1

| Step | Duration | Valves Open | Bed A Pressure | Bed B Pressure |
|---|---|---|---|---|
| A→B gas transfer, B-slow feed | 3.5 seconds | 3,9 & 10 | 68 psig | 52 psig |
| A-depres, B-N$_2$ pres, B-slow feed | 0.5 seconds | 3,5 & 12 | | 90 psig |
| A-depres, B-feed | 2 seconds | 1,3,5 & 12 | 38 psig | 95 psig |
| A-depres, B-feed | 4 seconds | 1,3,5,7 & 12 | 0–2 psig | |
| A-purge, B-feed | 50 seconds | 1,3,5,7, 9 & 12 | | 100 psig |
| A-cut, B-feed | 30 seconds | 1,3,9 & 12 | 15 psig | 100 psig |
| B→A gas transfer, A-slow feed | 3.5 seconds | 2,9 & 10 | 52 psig | 68 psig |
| B-depres, A-N$_2$ pres A-slow feed | 0.5 seconds | 2,6 & 11 | 90 psig | |
| B-depres, A-feed | 2 seconds | 1,2,6 & 11 | 95 psig | 38 psig |
| B-depres, A-feed | 4 seconds | 1,2,6,8 & 11 | | 0–2 psig |
| B-purge, A-feed | 50 seconds | 1,2,6,8, 10 & 11 | 100 psig | |
| B-cut, A-feed | 30 seconds | 1,2,10 & 11 | 100 psig | 15 psig |

The nitrogen production process of the present invention provides distinct advantages over the existing state of the art in nitrogen pressure swing adsorption technology through a combination of process features which allow the achievement of very high purities of nitrogen gas product, particularly 99.9% by volume nitrogen and higher purity. This goal is achieved with a minimization of capital costs and power requirements through the elimination of the constraints of full pressure equalization and by the provision of process controls which allow the matching of process conditions to the requirements of the particular nitrogen generation application.

For instance, the flow rates during bed to bed gas transfer, product repressurization, feed during bed to bed transfer and product purge can all be independently controlled for the appropriate product flow rate and purity, as well as the carbon molecular sieve adsorbent characteristics and ambient conditions. The parameters are particularly important to control when high purities of 99.9%, and above, nitrogen by volume is required, where the process is especially sensitive to the product end to product end gas transfer volume and the amount of product gas sent back on repressurization. These features allow the process of the present invention to have striking performance improvements over traditional nitrogen pressure swing adsorption systems, particularly in the 10 to 1,000 part per million oxygen range.

This capability is dramatically illustrated with reference to the figures identified above. For instance, in FIG. 2, a graph of the performance of a standard nitrogen pressure swing adsorption system, such as is described in U.S. Pat. No. 4,439,213, in which a nitrogen product is generated from air by switching adsorptive beds containing carbon molecular sieve in which the steps of adsorption, pressure equalization, depressurization, evacuation, product purge, pressure equalization, repressurization and continuation of the process in a cyclic basis in parallel beds is performed. The graph of FIG. 2 is a plot of product purity as percent by volume of oxygen against productivity which is nitrogen in standard cubic feet per hour per adsorbent in cubic feet shown in the blackened squares. Recovery, constituting nitrogen product as a percent of air processed, is shown in the open squares. It is readily apparent that as high purity is required, moving to the left of graph, the productivity and the recovery of a typical process drops off dramatically.

Figure 3:
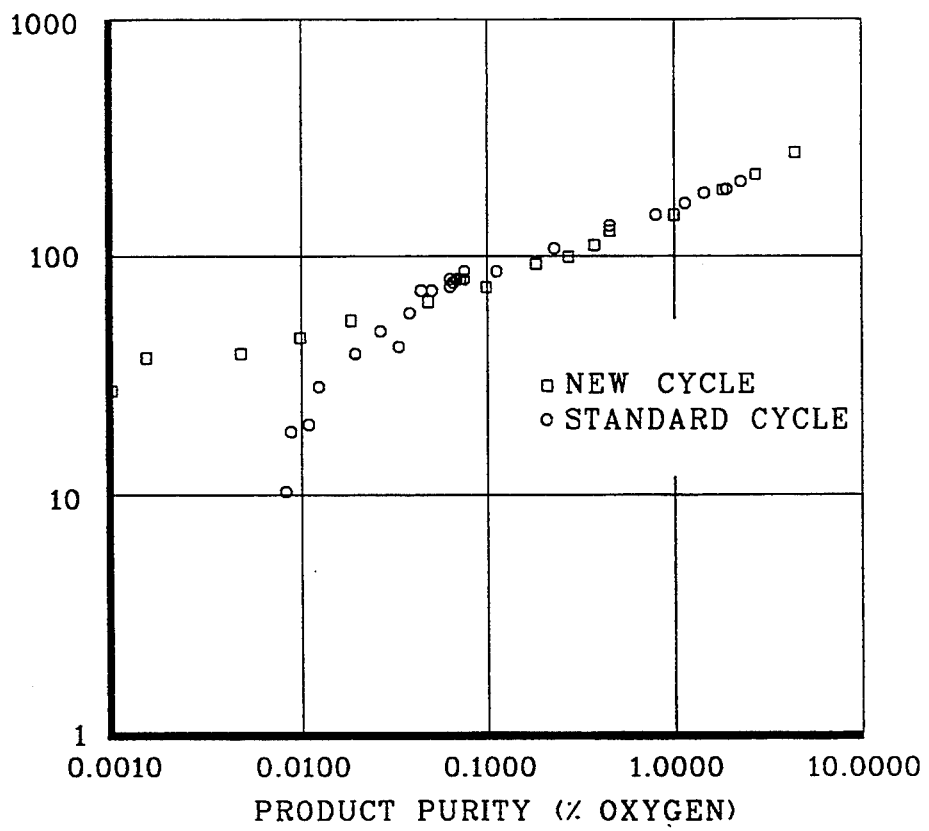
FIG. 3 is a graph of a comparison of productivity of the nitrogen pressure swing process of the present invention against a standard pressure swing adsorption process, such as U.S. Pat. No. 4,439,213.

In contrast, in FIG. 3, a graph of productivity versus product purity as a percent by volume of oxygen is compared between the new cycle of the present invention and the previously described standard cycle of the prior art (U.S. Pat. No. 4,439,213), where it is apparent that practicing the present invention, particularly at high purities, results in a dramatic improvement in productivity with only a modest decline in productivity as purities of nitrogen go up (oxygen content goes down) versus the dramatic decline in productivity of the prior art.

Figure 4:
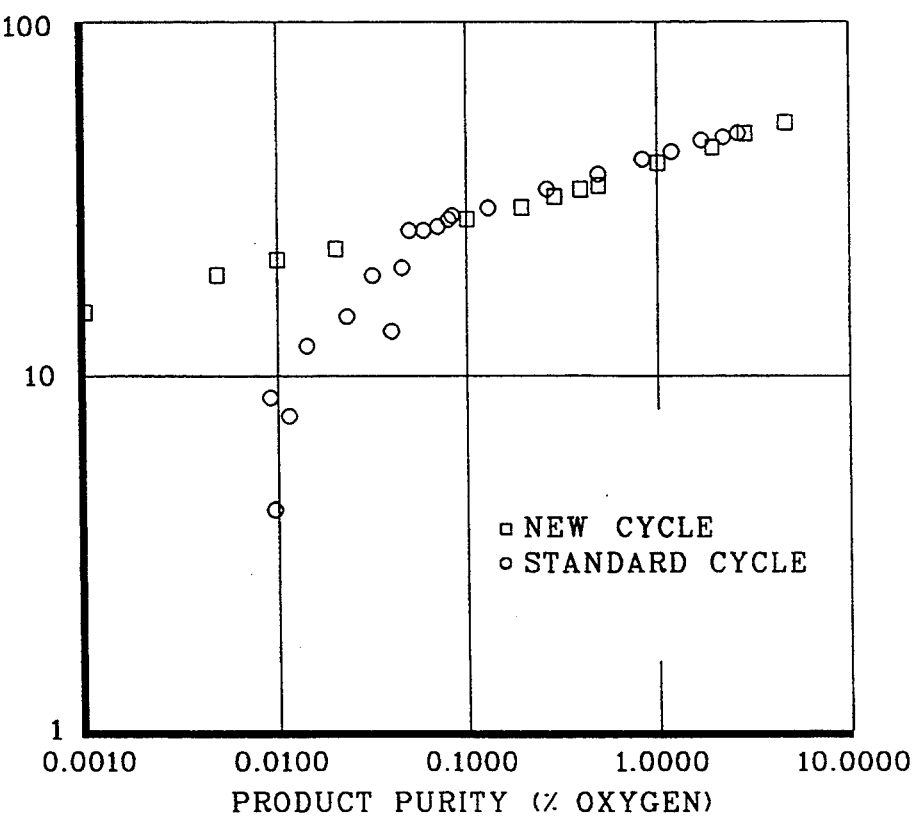
FIG. 4 is a graph of comparison of recovery of a nitrogen PSA process of the present invention in comparison to a standard pressure swing adsorption process, such as U.S. Pat. 4,439,213.

FIG. 4 demonstrates a comparable process effect between the new cycle of the present invention and the standard cycle described above when recovery is plotted against product purity as a percent by volume of oxygen. At the higher purities of nitrogen (oxygen content is lower), moving to the left of the graph, the present invention shows a steady although declining recovery in contrast to the rapidly decaying and diminishing recovery of the standard or prior art cycles.

One of the ways in which the present invention differs from traditional prior nitrogen pressure swing adsorption processes is in the control of various aspects of the gas transfer from a high pressure bed to a regenerating lower pressure bed. Typically, the prior art uses full pressure equalization between the beds. As described above, the present invention advantageously utilizes product end to product end gas transfer short of full equalization at a relatively slow rate and at a volume in excess of the overlapping but non-simultaneous feed end to feed end gas transfer.

Figure 5:
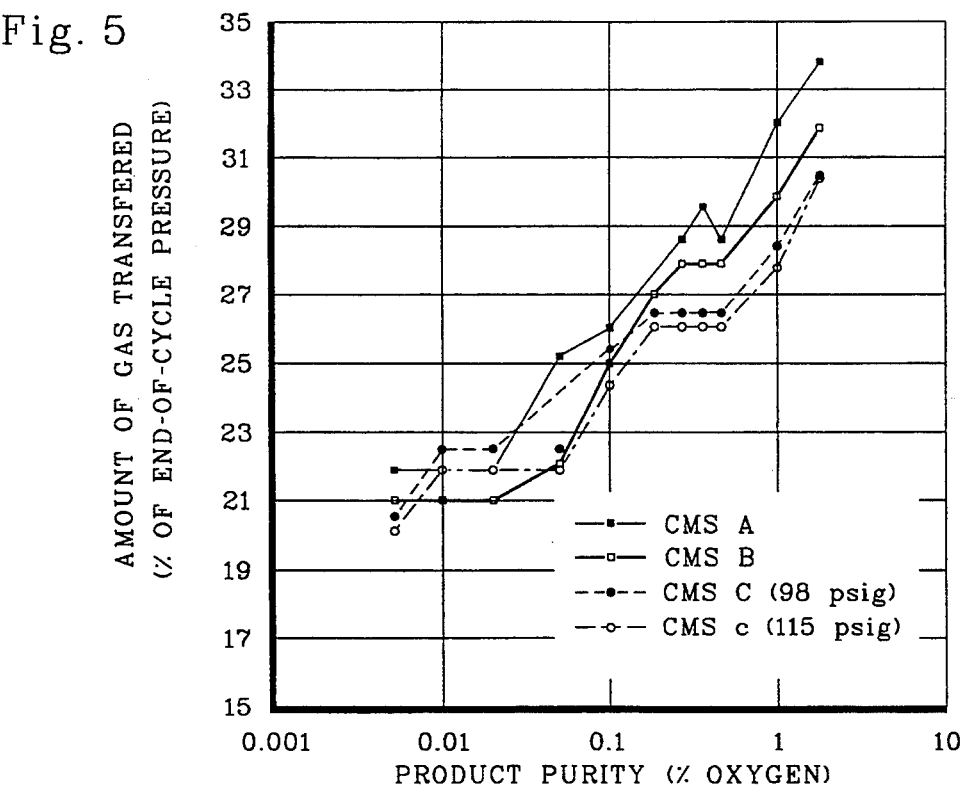
FIG. 5 is a graph of gas volume transferred across product ends of adsorption beds during bed to bed gas transfer in relation to product purity as percent of oxygen present by volume for three different carbon molecular sieves and one sieve at different pressures.

FIG. 5 represents optimized gas transfer based upon percent of pressure between adsorption and end of cycle depressurization versus product purity as percent by volume of oxygen for various carbon molecular sieve adsorbents and at various pressures. FIG. 5 shows that it is desirable to transfer less than sufficient gas for full equalization on the product end to product end of a nitrogen pressure swing adsorption process. Typically in dual end full pressure equalization there would be a 50% transfer, in terms of pressure level, from the highest pressure of the adsorption beds, with 25% being accounted for in the product to product end pressure equalization and 25% to be accounted for in the feed to feed end pressure equalization. The product to product end equalization would be 25% of the maximum overall process pressure differential.

However, FIG. 5 shows that in the present invention optimal pressure change by bed to bed gas transfer for the product to product end is rarely optimized at 25%. At the high purities desired by the present invention, it is readily apparent that the pressure change that the product to product end gas transfer performs is preferably less than what would otherwise be achieved in full equalization (ie., 25%).

At the highest purities recorded in FIG. 5, the product end to product end gas transfer would result in a 21 percent end of cycle pressure change from the highest pressure to the pressure decay occurring at the termination of gas transfer bed to bed. Therefore, it is readily apparent that the present invention practicing controlled gas transfer, rather than full pressure equalization, independently metered with regard to the product to product end gas transfer and the feed to feed end gas transfer, with regard to rate, volume and timing, provides improved performance at the high purities desired by the present invention.

A particularly important and unique feature of the present invention is the delayed, but overlapping sequence of gas transfer at the product to product end of tandem parallel beds versus the transfer at the feed to feed end of such beds. In the present invention a 4 second gas transfer involves 3 preliminary seconds of product to product ends gas transfer followed by a 1 second gas transfer across both the feed to feed ends of the beds and the product to product ends of the beds.

Figure 6:
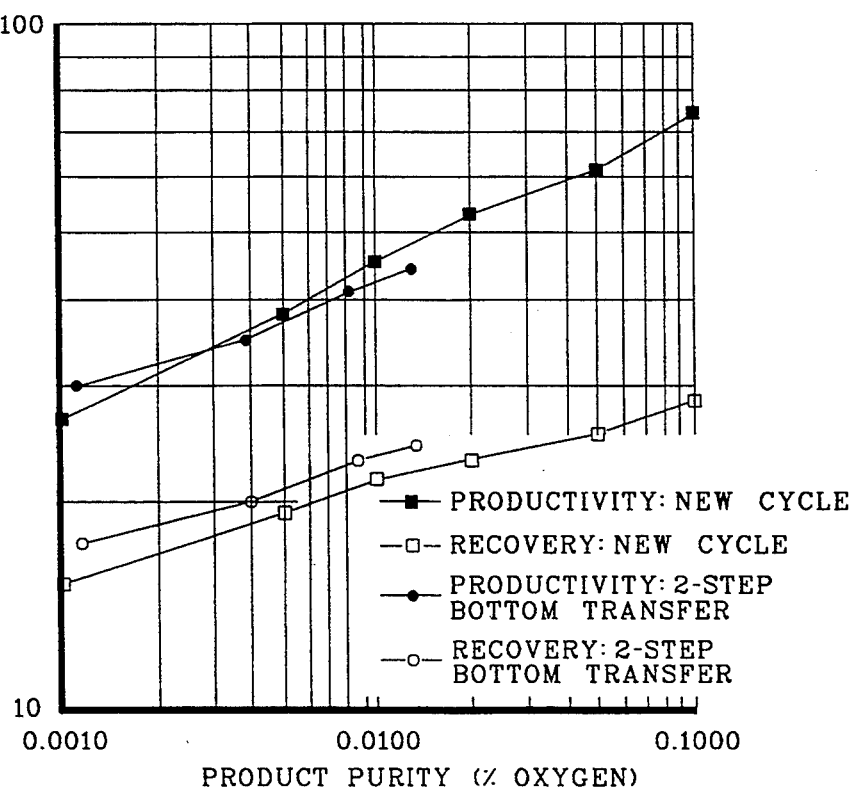
FIG. 6 is a graph of productivity and recovery of the present invention with and without two step bottom (feed end) transfer, wherein feed to feed gas transfer is delayed from the initiation of product to product end gas transfer.

FIG. 6 demonstrates the effect in a graph of productivity and recovery versus product purity as percent by volume of oxygen in the product nitrogen gas. The large darkened squares represent productivity of the present invention or new cycle without the delay of gas transfer of the feed to feed end transfer with respect to the initiation of the product end transfer. The large open squares are a graph of the recovery of the present invention or new cycle without this delayed gas transfer feature. In contrast, the small darkened diamonds are productivity using the two-step delayed transfer or bottom transfer, while the large open diamonds are recovery using the two-step bottom transfer for delayed gas transfer of feed to feed in contrast to product to product end gas transfer.

This graph demonstrates that productivity is enhanced as a function of higher purity using the delayed gas transfer of the present invention in contrast to full time simultaneous gas transfer of the respective ends of an adsorbent bed. More dramatically, the recovery consistently is enhanced but particularly so at high purities when the delayed gas transfer of the present invention is utilized. This data demonstrates the criticality of gas transfer by dual end communication of tandem parallel beds, wherein the feed to feed end transfer is delayed in its initiation with respect to the product to product end gas transfer. When high purities in excess of 99.99% by volume nitrogen are required, this feature of the present invention uniquely allows achievement of the purity goals without resort to excessive capital costs or power requirements as is required in the prior art.

Capital costs are also minimized by the continuous admission of feed gas mixture from the feed gas mixture compressor and the feed gas mixture tank through the controlled reduced flow of valve 13, which bypasses main valve 1. The feed gas mixture flows at full volume to the bed on production during the production step and switches to reduced volume, but continual flow, during the gas transfer step following production, wherein reduced feed flow goes to the pressure increasing bed. Feed continues during the ensuing product and feed repressurization of the gas transfer receiving bed. At that time, the repressurizing bed goes on to production and gas flow as provided to that bed. As a result, during the complete cycle of the present invention either full or partial introduction of feed gas mixture to at least one of the parallel plurality of beds is provided so as to avoid having to utilize a large feed surge tank or place undue stress on a compressor having an output which would be completely shut down. This capital cost reduction, when coupled with the step-wise depressurization which minimizes noise and therefore the size of vent muffler and its capital cost, as well as the controlled and minimized gas transfer across the feed ends of the respective beds, which minimizes water predosing on the repressurizing adsorbent bed, which minimizes desiccant layers and drying requirements, provides multiple rationales for reduced capital costs of the present invention. In addition, the isolation step or cut step in which minimum product purge gas continues to flow into the bed, allows the achievement of high purity by preventing oxygen molecules from migrating to the product end of the bed, which is particularly important during long isolation steps during turndown or low production of a nitrogen pressure swing adsorption process, such as the present invention, allowing purities to be maintained even at low production rates.

These features in combination demonstrate that the process of the present invention when the combination of features is utilized provides an economical way to produce high purity nitrogen on a non-cryogenic basis over a range of operating conditions. This capability has not been achieved by the prior art previously without resort to higher capital costs or higher power requirements.

Having described the present invention with regard to a preferred embodiment, it should be understood that the scope of the present invention is set forth by the claims which follow.

We claim:

1. A process for separating a nitrogen-enriched gas from a feed gas mixture containing at least nitrogen and oxygen using a plurality of beds of adsorbent that preferentially adsorb oxygen more readily than nitrogen, comprising the steps of:
   (a) introducing said feed gas mixture into a feed end of a first bed of said plurality of beds of adsorbent at an elevated feed pressure and adsorbing oxygen while removing unadsorbed nitrogen-enriched gas as a product from a product end of said first bed;
   (b) discontinuing the introduction of said feed gas mixture into said first bed and connecting the product end of said first bed to the product end of a second bed of said plurality of beds which is at lower pressure and transferring gas from the product end of said first bed to the product end of said second bed short of equalizing the pressure in the two beds;
   (c) connecting the feed end of said first bed to the feed end of said second bed, during a latter portion of the transfer of gas from the product ends of said beds in step (b), to transfer gas from the feed end of said first bed to the feed end of said second bed short of equalizing the pressure in the two beds;
   (d) countercurrently depressurizing said first bed at a main rate of depressurization to a lowest pressure;
   (e) passing nitrogen-enriched gas countercurrently through said first bed to purge oxygen from said bed;
   (f) isolating said first bed for a predetermined period of time while supplying nitrogen-enriched gas to said first bed at a reduced flow rate compared to step (e);
   (g) connecting the product end of said first bed to the product end of an other bed of said plurality of beds which is at elevated feed pressure and transferring gas from the product end of said other bed to the product end of said first bed short of equalizing the pressure in the two beds;
   (h) connecting the feed end of said first bed to the feed end of said other bed, during a latter portion of the transfer of gas from the product ends of said beds in step (g), to transfer gas from the feed end of said other bed to the feed end of said first bed short of equalizing the pressure in the two beds;
   (i) further repressurizing said first bed by the introduction of product gas at the product end of said first bed; and
   (j) repeating these process steps in each of said plurality of beds.

2. The process of claim 1 wherein after discontinuing gas transfer between said two beds of step (c) and before said countercurrently depressurizing of said first bed at said main rate of depressurization, initially countercurrently depressurizing said first bed to an intermediate pressure at a preliminary rate of depressurization which is less than said main rate of depressurization.

3. The process of claim 1 wherein said first bed is further repressurized with feed gas mixture at said feed end of said first bed.

4. The process of claim 1 wherein said plurality of beds comprises two beds.

5. The process of claim 1 wherein said adsorbent is a carbon molecular sieve.

6. The process of claim 1 wherein said nitrogen-enriched gas is at least 99.9% by volume nitrogen.

7. The process of claim 1 wherein said nitrogen-enriched gas is at least 99.99% by volume nitrogen.

8. The process of claim 1 wherein feed gas mixture is introduced into a bed while it is receiving gas transferred from one of said plurality of beds of adsorbent.

9. The process of claim 8 wherein introduction of feed gas mixture into a bed receiving gas transferred from one of the plurality of beds of adsorbent is at a rate less than step (a).

10. The process of claim 1 wherein said feed gas mixture is introduced into said plurality of beds of adsorbent continuously during the process.

11. The process of claim 1 wherein said feed gas mixture is air.

12. The process of claim 1 wherein said gas transferred in step (b) is in volumetric excess of said gas transferred in step (c).

13. The process of claim 1 wherein said elevated feed pressure is in the range of approximately 80 to 165 psia.

14. The process of claim 1 wherein said lowest pressure is in the range of approximately 20 to 14.7 psia.

15. The process of claim 1 wherein a volumetric ratio of said gas transfer of step (b) to said gas transfer of step (c) is in the range of approximately 1:1 to 1.3:1.

16. The process of claim 1 wherein said plurality of beds comprises two beds and said second bed and said other bed are the same.

* * * * *